(No Model.)
R. C. BAIRD.
HOLDBACK.
No. 411,774.  Patented Oct. 1, 1889.
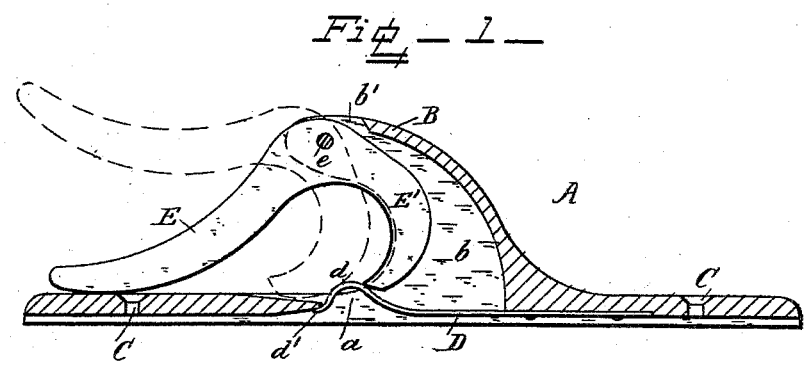
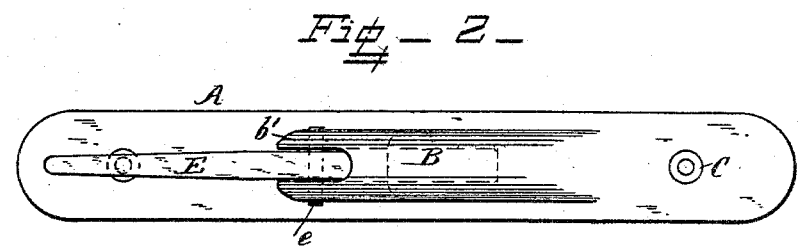
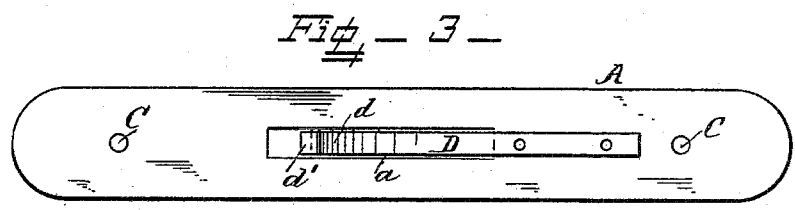
Witnesses  
C. T. Beer  
W. Allen
Inventor  
R. C. Baird  
By his Attorney  
Herbert W. T. Jenner.

UNITED STATES PATENT OFFICE.

RUDOLF C. BAIRD, OF CHIPLEY, FLORIDA.

HOLDBACK.

SPECIFICATION forming part of Letters Patent No. 411,774, dated October 1, 1889.

Application filed February 21, 1889. Serial No. 300,661. (No model.)

*To all whom it may concern:*

Be it known that I, RUDOLF C. BAIRD, a citizen of the United States, residing at Chipley, in the county of Washington and State of Florida, have invented certain new and useful Improvements in Holdbacks; and I do hereby declare the following to be a full, clear, and exact description of the invention, such as will enable others skilled in the art to which it appertains to make and use the same.

This invention relates to holdbacks for vehicles; and it consists in the novel construction and combination of the parts, as hereinafter fully described and claimed.

In the drawings, Figure 1 is a longitudinal section through the holdback. Fig. 2 is a plan view of the holdback from above, and Fig. 3 is a plan view of the same from below.

A is the holdback, provided with the rearwardly-curved horn B, having the hollow or recess $b$ in its concave side.

C are holes for the screws which attach the holdback to the vehicle. A hole $a$ is formed in the holdback under the bifurcated extremity $b'$ of the horn B, and through this hole the double-acting curved portion $d$ of the spring D projects. The spring D is secured at one end in a groove in the bottom of the holdback, and is provided with the stop $d'$ upon its other end beyond the upwardly-curved portion $d$. This stop comes against the edge of the hole $a$ and prevents the curved portion of the spring from rising too far through the hole.

E is a curved arm pivoted upon the pin $e$, which passes through the bifurcated end $b^r$ of the horn, and E' is a hook, which is formed of a continuation of the arm E upon the other side of its pivot-pin; but the bend of the hook is in the opposite direction from that of the arm, and the hook is bent to correspond with the curve of the horn and to fit snugly within the hollow. When the device is not in use, the hook E' rests in the hollow $b$ of the horn, with its end pressed back by that side of the curved portion $d$ of spring D which comes nearest the base of the horn, and with the curved arm E closed down and resting upon the holdback, as shown in Fig. 1. The spring keeps the curved arm in this position and prevents it from rattling.

When the trace is to be coupled to the holdback, the curved arm E is turned upon its pivot-pin to the position indicated by the dotted lines in Fig. 1, or as much farther as desirable. The curved arm now forms, as it were, a continuation of the horn of the holdback, and the hook E' is withdrawn from the hollow $b$, and is prevented from returning of itself by the spring D, because the end of hook E' now rests against that part of the curved portion $d$ of the spring which comes nearest to the stop $d'$. The end of the trace is slipped over the curved arm E and horn B, and the arm E is restored to its former position, as shown by the full lines in Fig. 1, by the pressure of the end of the trace against the hook E', or the said arm may be turned by hand.

What I claim is—

1. The combination, with the holdback provided with the curved horn, of the curved arm pivoted to the end of the horn and provided with a hook bent to correspond with the curve of the horn, and a double-acting spring secured to the holdback under the said horn and bearing against the extreme end of the hook for holding the curved arm up or down, substantially as set forth.

2. The combination, with the holdback provided with the curved recessed horn having its end bifurcated, of the curved arm pivoted in the said bifurcated end and provided with a hook fitting inside the hollow in the horn, and a spring secured to the holdback under the horn for retaining the hook in the said hollow, substantially as and for the purpose set forth.

3. The combination, with the holdback provided with the curved horn and the hole under the horn, of the curved arm pivoted to the horn and provided with a hook, and a spring secured to the holdback under the horn and provided with a double-acting curved portion engaging with the end of the said hook through the said hole in the holdback, substantially as and for the purpose set forth.

4. The combination, with the holdback provided with the curved horn and the hole under the horn, of the curved arm pivoted to the horn and provided with a hook, and a spring secured to the holdback at one end and provided with a double-acting curved portion projecting through the hole in the holdback and engaging with the end of the said hook, and a stop upon its free end engaging with the edge of the said hole, substantially as and for the purpose set forth.

In testimony whereof I affix my signature in presence of two witnesses.

RUDOLF C. BAIRD.

Witnesses:
T. M. McCULLOUGH,
J. G. MURFEE.